United States Patent
Roa-Espinosa

(10) Patent No.: US 8,076,391 B2
(45) Date of Patent: Dec. 13, 2011

(54) COPOLYMER COMPOSITION FOR PARTICLE AGGREGATION

(76) Inventor: Aicardo Roa-Espinosa, Madison, WI (US)

( * ) Notice: Subject to any disclaimer, the term of this patent is extended or adjusted under 35 U.S.C. 154(b) by 0 days.

(21) Appl. No.: 10/970,039

(22) Filed: Oct. 21, 2004

(65) Prior Publication Data

US 2006/0089443 A1    Apr. 27, 2006

(51) Int. Cl.
C09K 17/40 (2006.01)
C09K 3/22 (2006.01)
C08K 3/28 (2006.01)

(52) U.S. Cl. ......... 523/132; 252/88.1; 252/180; 524/35; 524/300; 524/429; 524/474

(58) Field of Classification Search .................. 523/132; 252/88.1, 180; 524/35, 300, 429, 474
See application file for complete search history.

(56) References Cited

U.S. PATENT DOCUMENTS

| | | | |
|---|---|---|---|
| 2,625,529 A | | 1/1953 | Hendrick et al. |
| 2,652,380 A | | 9/1953 | Hedrick et al. |
| 3,798,838 A | | 3/1974 | Hashimoto et al. |
| 3,900,378 A | | 8/1975 | Yen et al. |
| 4,035,317 A | | 7/1977 | Gershberg |
| 4,214,712 A | | 7/1980 | van Hoorn |
| 4,218,012 A | | 8/1980 | Hamza et al. |
| 4,405,728 A | | 9/1983 | Krebs et al. |
| 4,417,992 A | | 11/1983 | Bhattacharyya et al. |
| 4,518,261 A | | 5/1985 | Sekimoto et al. |
| 4,559,074 A | | 12/1985 | Clarke |
| 4,565,635 A | * | 1/1986 | Le Du et al. .................. 210/727 |
| 4,610,311 A | * | 9/1986 | Bronner et al. .................. 169/45 |
| 4,797,145 A | | 1/1989 | Wallace et al. |
| 5,127,187 A | | 7/1992 | Hattori et al. |
| 5,332,524 A | | 7/1994 | Kaylor |
| 5,450,985 A | | 9/1995 | Meuleman |
| 5,548,020 A | | 8/1996 | Santini et al. |
| 5,580,168 A | | 12/1996 | Alireza et al. |
| 5,605,970 A | | 2/1997 | Selvarajan |
| 5,637,556 A | | 6/1997 | Argillier et al. |
| 5,837,776 A | | 11/1998 | Selvarajan et al. |
| 5,885,032 A | | 3/1999 | Mallon et al. |
| 6,136,219 A | | 10/2000 | Decker |
| 6,288,010 B1 | * | 9/2001 | Rose et al. .................. 504/206 |
| 6,423,109 B2 | * | 7/2002 | Brigance et al. .................. 71/34 |
| 6,562,882 B2 | | 5/2003 | Harrison |
| 6,669,752 B2 | | 12/2003 | Arnold et al. |

FOREIGN PATENT DOCUMENTS

EP    0 181 983    5/1986

OTHER PUBLICATIONS

Machine Translation of EP 0 181 983, May 28, 1986.*

Entry et al., "The Efficacy of Polyacrylamide and Related Compounds to Remove Microorganisms and Nutrients from Animal Wastewater," *J. Environmental Quality*, (2000) 29:6:1905-1914.
Han et al., "Stormwater Filtration of a Municipal Detention Pond," Chapter 39 of Kenaf Properties, Processing and Products, pp. 471-485.
Ben-Hur et al., "Polymer Effects on Water Infiltration and Soil Aggregation," *Soil Soc. Am. J.*, (1997) 61:565-570.
Chamberlain et al., "Influence of Structure and Formulation on the Efficacy of Polyacrylamides as Soil Stabilizers," Proceedings from Conference Held at College of Southern Idaho, May 6-8, 1996, pp. 83-87.
Dawson et al., "Physical Effects of Polyacrylamide on Natural Resources," Proceedings from Conference Held at College of Southern Idaho, May 6-8, 1996, pp. 110-114.
Deskin et al., "Product of Stewardship Considerations in the Use of Polyacrylamides in Soil Erosion Applications," Proceedings from Conference Held at College of Southern Idaho, May 6-8, 1996, pp. 31-33.
Kay-Shoemake et al., "Microbial Ecology of Polyacrylamide Application in Agricultural Soils," Proceedings from Conference Held at College of Southern Idaho, May 6-8, 1996, pp. 33-41.
Kincaid et al., "Spray Patterns from Fan-Type Nozzles-for Applying PAM to Soil Surfaces," Proceedings from Conference 27 Held in Seattle, WA, Feb. 27-Mar. 1, 1996, pp. 455-466.
Lehrsch et al., "Polyacrylamide Sprayed on Solid Surfaces Can Stabilize Soil Aggregates," Proceedings from Conference 27 Held in Seattle, WA, Feb. 27-Mar. 1, 1996, pp. 533-538.
Lentz et al., "Five-Year Research Summary Using PAM in Furrow Irrigation," Proceedings from Conference Held at College of Southern Idaho, May 6-8, 1996, pp. 20-27.
Roa-Espinosa et al, "Determination of PAM Use Potential in Erosion Control on Construction Sites," 1st Inter-Regional Conference on Environmental-Water: Innovative Issues in Irrigation and Drainage, Lisbon Portugal, Sep. 16-18, 1998.
Roa-Espinosa, "Screening of Polymers to Determine their Potential Use in Erosion Control on Construction Sites," Proceedings from Conference Held at College of Southern Idaho, May 6-8, 1996, pp. 77-83.
Sojka et al., "Water and Erosion Management with Multiple Applications of Polyacrylamide in Furrow Irrigation," *Soil Sci. Soc. Am. J.*, (1998) 62:1672-1680.
Sojka et al, "Influence of Polyacrylamide Application to Soil on Movement of Microorganisms in Runoff Water," Research article accepted by USDA Agricultural Research Service in Kimberly, ID on Jul. 13, 1999.
Wu, Laosheng, "Polyacrylamide (PAM)—Effective Erosion Fighter and Infiltration Enhancer but not a Conserver of Water," UW California, Riverside Study (2001).

* cited by examiner

*Primary Examiner* — Vickey Nerangis
(74) *Attorney, Agent, or Firm* — Philip M. Weiss; Weiss & Weiss

(57) ABSTRACT

A composition for erosion control, dust abatement, and/or water clarification comprising an anionic polyacrylamide, and at least one inorganic salt, wherein the combination of the anionic polyacrylamide and at least one inorganic salt form a molecule with a chain larger than $5 \times 10^{-3}$ μm (50 angstroms).

20 Claims, No Drawings

COPOLYMER COMPOSITION FOR PARTICLE AGGREGATION

FIELD OF THE INVENTION

The present invention relates to novel compositions used for particle aggregation. The compositions are useful for a variety of potential applications including erosion control, dust control, and water clarification. In particular, the invention is drawn to a composition and method of reacting anionic polyacrylamide with inorganic salts to form a polyacrylamide composition with improved dust and soil binding properties.

Erosion prevention, dust abatement and water clarification are important in a variety of industries. Construction and maintenance projects, particularly those associated with public works, often cause significant amounts of soil erosion. In addition, urban municipalities produce substantial amounts of dust associated with street sweeping operations. Dust from soil erosion, as well as toxic dust from urban streets, is problematic in that resulting sediments run off into lakes and rivers from nearby construction sites or via storm sewer systems, negatively impact water quality. In addition, dust clouds cause lack of visibility at helicopter landings, construction sites, agricultural fields, roads, car race tracks, horse tracks, and horse arenas, and can have a profound effect on the safety.

Conventional methods to control the resulting dust and run-off, are generally ineffective, expensive, or toxic to local watersheds and vegetation. Non-toxic methods have focused on native vegetation planting around project perimeters, as a buffer to erosion, however these methods are relatively ineffective due to low germination rates and sensitivity of the plants to nitrates.

Standard chemical methods for controlling erosion and dust abatement, while somewhat more effective than plantings, are often more problematic because they are difficult to apply and toxic, both to workers and to the environment. In addition, traditional abatement methods are only effective in controlling specific soil sediments such as clay, silt, or sand only, and currently there is no effective method to treat a variety or combination of particulates. Current methods for controlling dust abatement and erosion use chemicals which are often insoluble in water, and require on-site application of excessive amounts of the chemicals to achieve control of erosion and desired water quality.

SUMMARY OF THE INVENTION

The composition of the present invention provides an effective, non-toxic and water-soluble composition for particle aggregation. The composition can be used in various embodiments for erosion control, water clarification, and dust abatement.

The present invention provides a composition which is comprised of a copolymer and other optional compounds. The copolymer comprises an anionic polyacrylamide and an inorganic salt.

In one embodiment of the composition the inorganic salts include any one of, or a mixture of, calcium nitrate, calcium nitrate tetrahydrate, calcium nitrate trihydrate, calcium nitrite, potassium nitrate, and potassium nitrite. These copolymers suitably have a chain which is suitably longer than 500 angstroms.

In another embodiment of the composition the inorganic salts include any one of, or a mixture of sodium silicate, sodium disilicate, sodium metasilicate, potassium silicate, potassium disilicate, potassium metasilicate and potassium tetrasilicate. These copolymers have a chain which is suitably longer than 50 angstroms, more suitably the copolymers have a chain length which is longer than 200 angstroms In another embodiment of the copolymer the inorganic salt comprises calcium sulfate. These copolymers suitably have a chain which is longer than 500 angstroms.

In still another embodiment of the copolymer the inorganic salts can comprise aluminum chloral hydrate or aluminum oxide. These copolymers have a chain which is suitably longer than 500 angstroms.

In addition to the copolymer, the composition can also contain ammoniacal nitrogen and lignosulfonate.

The composition can also be tailored for a variety of dispersal media. A dry, liquid and block form of the compound is possible. When dispersed as a liquid the composition can suitably contain water, a surfactant, paraffinic oil or any combination of these ingredients. When dispensed in water, the composition can be made in a block form which dissolves. This block form of the composition can further comprise a soap base.

The invention also provides a method of producing copolymer compositions.

In one embodiment the invention provides a method of making a copolymer composition. The method comprises combining an anionic polyacrylamide with an inorganic salt, selected from the group consisting of calcium nitrate, calcium nitrate tetrahydrate, calcium nitrate trihydrate, calcium nitrite, potassium nitrate, potassium nitrite, sodium silicate, sodium disilicate, sodium metasilicate, potassium silicate, potassium disilicate, potassium metasilicate, potassium tetrasilicate, calcium sulfate, aluminum chloral hydrate or aluminum oxide to obtain a copolymer composition. This composition can be further combined with a surfactant/liquid composition, wherein the liquid can be water or paraffinic oil.

The invention also provides a method making a liquid microsuspension. The method comprises preparing a first composition comprising paraffinic oil and/or surfactant. Preparing a second composition comprising polyacrylamide and optionally, inorganic salt, water, ammoniacal nitrogen, lignosulfonate or other agents. Placing the two compositions into a high pressure, dual feed homogenizer and mixing the two compositions in the homogenizer to obtain a liquid microsuspension composition.

Before the embodiments of the invention are explained in detail, it is to be understood that the phraseology and terminology used herein are for the purpose of description and should not be regarded as limiting. The use of "including", "having" and "comprising" and variations thereof herein is meant to encompass the items listed thereafter and equivalents thereof as well as additional items and equivalents thereof.

DETAILED DESCRIPTION OF THE INVENTION

The present invention provides novel compositions for particle aggregation.

Colloidal particles, such as dust and soil particles, are surrounded by a diffuse electrical layer. The diffuse layer electrical charge is denominated by the Z potential. The Z potential is the measurement of the force by which the colloidal particles are electrically charged. This charge represents a negative force measured in millivolts. It is due to the Z potential that particles reject one another. The charge of the particles produces a buoyancy effect where particles become lighter than air, particularly with fine particles such as silts and clays. The buoyancy effect on fine particles creates dust clouds and water cloudiness. These fine particles remain in suspension unless the Z potential is destabilized.

The present invention provides a composition which comprises a copolymer composition which destabilizes the Z potential. The copolymer composition comprises an anionic polyacrylamide and an inorganic salt. The inorganic salts of the copolymer can be any suitable inorganic salt including calcium nitrate, calcium nitrate tetrahydrate, calcium nitrate trihydrate, calcium nitrite, potassium nitrate, potassium nitrite, sodium silicate, sodium disilicate, sodium metasilicate, potassium silicate, potassium disilicate, potassium metasilicate, potassium tetrasilicate and calcium sulfate.

The copolymer composition of the present invention provides positive charges to reduce the magnitude of the Z potential of colloidal particles. The copolymer composition completely collapses the electrical layer that surrounds the colloidal particles; after this collapse of the diffuse electrical layer the particles can be coagulated and flocculated. The copolymer composition binds to the colloidal particles by the charged bridges of the inorganic salts of the copolymer. One molecule of the copolymer composition is bound to many colloidal particles in such a way that the particles form flocks or the aggregates which are more stable. For example, when used with soil, soil particle separation does not occur, preventing the slaking of the aggregate and preventing the formation of soil crust at the surface of the soil due to the separation of the soil particle. The size of the copolymer is small enough to allow penetration into the soil and large enough that that it can to bind to numerous colloidal particles aiding in aggregation.

The composition of the present invention can also contain other optional compounds such as ammoniacal nitrogen and lignosulfonate. Ammoniacal nitrogen can be used to provide better binding of calcium to the anionic polyacrylamide. Lignosulfonate helps to bind calcium sulfate as a pellet, as opposed to a powder.

The composition can be produced in dry, liquid and block forms. In the liquid form, in addition to the copolymer, ammoniacal nitrogen, water, surfactant and paraffinic oil may also be present. In the block form a soap base can be present. The composition can also be made in a liquid microsuspension form by using a high pressure dual feed homogenizer. The microsuspension form contains particles of polyacrylamide (and optionally inorganic salts) suitably having a particle size ($D_{50}$<80 nanometers in length when a nozzle of 0.1 mm is used. The microsuspension form can contain particles of polyacrylamide (and optionally inorganic salts) suitably having a particle size ($D_{50}$>700 nanometers in length of when a nozzle 0.25 mm is used.

EXAMPLE 1

Method of Making a Dry Copolymer Composition

Polyacrylamide of high to very high molecular weight (suitable ranges include 15-25 megagrams/mole and/or >500, 000 acrylamide monomers, but can include other ranges as well) is provided. Suitably the polyacrylamide can be in the form of a dry bead having a diameter of 0.5-3 mm. The polyacrylamide is combined with one or more inorganic salts which are calcium nitrate, calcium nitrate tetrahydrate, calcium nitrate trihydrate, calcium nitrite, potassium nitrate, potassium nitrite, sodium silicate, sodium disilicate, sodium metasilicate, potassium silicate, potassium disilicate, potassium metasilicate, potassium tetrasilicate, calcium sulfate, aluminum chloral hydrate or aluminum oxide. The ratio of polyacrylamide to inorganic salt(s) can suitably be 3:1, 2:1, 1:1, 1:2 and 1:3. A suitably ratio also includes a ratio of 5:1 of polyacrylamide to inorganic salt(s). All ratios provided are on a weight basis unless otherwise noted.

If the inorganic salt(s) used are calcium nitrate, calcium nitrate tetrahydrate, calcium nitrate trihydrate, calcium nitrite, potassium nitrate or potassium nitrite, ammoniacal nitrogen can also added. The inorganic salts aluminum chloral hydrate and calcium nitrate and/or potassium nitrate can also be combined with ammoniacal nitrogen. The ratio of ammoniacal nitrogen to inorganic salt(s) is suitably in a range of (0.05-3): 1.

If the inorganic salt used is calcium sulfate, lignosulfonate can be added. The ratio of lignosulfonate to the inorganic salt(s) is suitably in a range of (0.05-3):1.

The polyacrylamide, inorganic salt(s) and optional agents are mixed, preferably by a mechanical mixer which produces a fairly even distribution of the compounds, to obtain the copolymer composition The mixing of the polyacrylamide, inorganic salt(s) and any other optional agents is done mechanically with any device that produces an appropriate distribution of the product. The combination of the polyacrylamide, inorganic salt(s) form a copolymer which suitably has a chain length greater than 500 angstroms.

EXAMPLE 2

Dry Copolymer Composition with Calcium Nitrate and Potassium Nitrate 20 pounds of calcium nitrate, 20 pounds of potassium nitrate, 2 pounds of ammoniacal nitrogen and 80 pounds of polyacrylamide are added to a commercial mixer which mixes the compounds at a speed of 400 rpm for 15 minutes. The compounds form a copolymer. The copolymer was tested to determine the length of the copolymer chains using a NanoStar device (made by Bruker AXS). The copolymer was shown to have a chain length greater than 500 angstroms.

EXAMPLE 3

Dry Copolymer Composition with Sodium Silicate 20 pounds of sodium silicate ($Na_2O \times SiO_2$, ratio of 3.22 $SiO_2$ to $Na_2O$) was mixed mechanically with 60 pounds of polyacrylamide in a container for 10 minutes until the products were considered distributed in the mix.

The copolymer was tested to determine the length of the copolymer chains using a NanoStar device (Brucker AXS). The copolymer was shown to have a chain length greater than 200 angstroms.

EXAMPLE 4

Dry Copolymer Composition with Potassium Silicate 20 pounds of potassium silicate ($K_2O \times SiO_2$, ratio of 2.5 $SiO_2$:$K_2O$) was mixed mechanically with 60 pounds of polyacrylamide in a container for 10 minutes until the products were considered distributed in the mix. The copolymer had a chain length greater than 200 angstroms.

EXAMPLE 5

Dry Copolymer Composition with Calcium Sulfate 20 pounds of calcium sulfate were mixed with of 2 pounds of lignosulphonate. The compounds are mixed mechanically in a container for 10 minutes until the products were considered distributed in the mix. 60 pounds of polyacrylamide was added, and the mixture was again mixed. The mixed compounds formed a copolymer.

The copolymer was tested to determine the length of the copolymer chains using a NanoStar device (Bruker AXS). The copolymer was shown to have a chain length greater than 500 angstroms.

EXAMPLE 6

Dry Copolymer Composition with Aluminum Chloral Hydrate and Calcium Nitrate 10 pounds of aluminum chloral hydrate were added to 10 pounds of calcium nitrate and 2 pounds of amonical nitrogen. 100 pounds of polyacrylamide were also added. The compounds were mixed mechanically in a mixer for 10 minutes until the products were considered distributed in the mix. The mixed compounds formed a copolymer that has a chain length greater than 500 angstroms.

EXAMPLE 7

Method of Making a Liquid Copolymer Composition

A liquid composition is prepared which can comprise water and/or paraffinic oil and a surfactant. The inorganic salts and any other optional dry agents are mixed with the liquid composition in a mechanical mixer. While mixing, polyacrylamide is slowly added to the mixer. Suitably the mixer operates at between 400-800 RPM for about 15 min. The use of higher RPMs will break the composition in smaller molecules of the copolymer.

The polyacrylamide used is suitably of high to very high molecular weight (suitable ranges include 15-25 megagrams/mole and/or >500,000 acrylamide monomers, but can include other ranges as well). Suitably the polyacrylamide can be in the form of a dry bead having a diameter of 0.5-3 mm. The ratio of polyacrylamide to inorganic salt(s) can suitably be 3:1, 2:1, 1:1, 1:2 and 1:3. A suitable ratio also includes a ratio of 5:1 of polyacrylamide to inorganic salt(s).

Surfactant is provided in an amount which is suitably 1-7% by weight of the total composition (the term "total composition" being polyacrylamide, inorganic salt(s), parrafinic oil (if added), water (if added), surfactant and any other optional agents added). Suitable surfactants include alkyl phenol exthoxylate and tall fatty acids.

Paraffinic oil is provided in an amount which is suitably 1-33% by weight of the total composition, and more suitably is 20-30% by weight of the total composition. Water can also be provided, suitably in an amount which is 1-33% by weight of the total composition.

The polyacrylamide can suitably be present in an amount up to 50% by weight of the total composition, and more suitably is present in a range of 20-30% by weight of the total composition.

If the inorganic salt(s) used are calcium nitrate, calcium nitrate tetrahydrate, calcium nitrate trihydrate, calcium nitrite, potassium nitrate or potassium nitrite, ammoniacal nitrogen can also added. The inorganic salts aluminum chloral hydrate and calcium nitrate and/or potassium nitrate can also be combined with ammoniacal nitrogen. The ratio of ammoniacal nitrogen to inorganic salt(s) is suitably in a range of (0.05-3):1.

If the inorganic salt used is calcium sulfate, lignosulfonate can be added. The ratio of lignosulfonate to the inorganic salt(s) is suitably in a range of (0.05-3):1.

EXAMPLE 8

Liquid Copolymer Composition with Calcium and Potassium Nitrate 12.5 pounds of calcium nitrate, 12.5 pounds of potassium nitrate, 2 pounds of ammoniacal nitrogen, 1 pound of paraffinic oil, 1 pound of alkyl phenol exthoxylate, 70 pounds of water (between 35-50° C.) are added in a mixer. 25 pounds of polyacrylamide is slowly added to the composition and the composition is mixed at 400 to 800 RPM for 5 to 10 minutes. The copolymer is tested to determine the length of the copolymer chains using a NanoStar device (Bruker AXS). The copolymer is shown to have a chain length greater than 500 angstroms.

EXAMPLE 9

Liquid Copolymer Composition with Calcium Nitrate 70 pounds of warm water at 40° C. is added to 1 pounds of surfactant (Alkyl phenol exthoxylate and tall fatty acids). This mixture is then combined with 25 pounds of calcium nitrate, 1 pound of amomnical nitrogen and 30 pounds of paraffinic oil. 30 pounds of polyacrylamide is then added. This mixture is mixed in a mechanical mixer operated at 400 to 800 RPM for 15 to 20 minutes. The copolymer has a chain length greater than 500 angstroms.

EXAMPLE 10

Liquid Copolymer Composition with Sodium Silicate or Potassium Silicate

Sodium silicate or potassium silicate is mixed with hot water in a ratio of 2:1 to provide a silica gel. Polyacrylamide is mixed with room temperature or warm water at a ratio of 4 parts water to 1 part polyacyrlamide until the polyacrylamide is dissolved. The polyacrylamide/water mixture is mixed with the silica gel in a 1:1 mix. The polyacrylamide and the silicate gel are mixed thoroughly to provide the copolymer composition.

EXAMPLE 11

Liquid Copolymer Composition with Sodium Silicate or Potassium Silicate 70 pounds of sodium silicate was mixed with 35 pounds of 95° C. water. The water and sodium silicate was mixed utilizing a mechanical mixer for 10 minutes until a silicate gel is formed. 50 pounds of polyacrylamide was mixed with 200 pounds room temperature water. The polyacrylamide and the silicate gel were mixed in a mixer operated at 800 RPMs for 15 minutes until all the polymer is dissolved. 50 pounds of the polyacrylamide/water mixture was mixed with 50 pounds of the silica gel. The polyacrylamide and the silicate gel were mixed thoroughly to provide the copolymer composition.

The copolymer was tested to determine the length of the copolymer chains using a NanoStar device (Bruker AXS). The copolymer was shown to have a chain length greater than 200 angstroms.

EXAMPLE 12

Liquid Copolymer Composition with Calcium Sulfate 25 pounds of calcium sulfate is mixed with 2 pounds of lignosulfonate. The calcium sulfate/lignosulfonate mix is dissolved in 50 pounds of warm water between 35 to 40° C. The mixture is then mixed at 400 to 800 RPM for 5 to 10 minutes. Polyacrylamide is suitably mixed with room temperature or warm water at a ratio of 4 parts water to 1 part polyacyrlamide. 25 pounds of polyacrylamide is mixed with 100 pounds of warm water until the polyacrylamide is dissolved (polyacrylamide is suitably mixed with room temperature or warm water at a ratio of 4 parts water to 1 part polyacyrlamide). The calcium sulfate/lignosulfonate/water mix is thoroughly mixed with the polyacrylamide/water mix to form the liquid copolymer.

The copolymer is tested to determine the length of the copolymer chains using a NanoStar device (Bruker AXS). The copolymer is shown to have a chain length greater than 500 angstroms.

EXAMPLE 13

Method of Making a Liquid Copolymer Microsuspension Composition

The liquid copolymer can also be produced by the use of a high pressure dual feed homogenizer, such as those provided by BEE International of South Easton, Mass. (product specifications incorporated herein by reference). A first mixture is prepared which comprises paraffinic oil and optionally, surfactant. A second mixture is prepared which comprises polyacrylamide, and optionally water, inorganic salts, or other optional agents (such as ammoniacal nitrogen and lignosulfonate). The first mixture is placed in one feed reservoir of the homogenizer and the second mixture is placed in the second feed reservoir of the homogenizer. The two mixtures are streamed through two opposite inlets and nozzles to create two high velocity jet streams impacting each other in a reactor cell in the homogenizer. The velocities of the two streams can reach approximately 700 m/s at 3100 bar. As the two mixtures collide, a new viscous solution is provided.

In one aspect, the newly formed viscous solution is suitably produced at a rate of a liter 1 to 5 liters per minute with a concentration of 50 pounds of polymer for every 50 pounds of oil or/and water for a viscous solution of 50%. Suitably, the copolymer suspension has a liquid consistency similar to water but with a density of 0.8 to 0.9 grams/c$^3$. The consistency of the polymer-oil solution is completely transparent and yellowish-brown color. The consistency of the polymer-water solution is completely crystalline. The viscous solution of polymer is collected in a container.

EXAMPLE 14

Method of Making a Liquid Polyacrylamide Microsuspension Composition 50 pounds of paraffinic oil was added into a first feed resevoir of a high pressure dual feed homogenizer. 50 pounds of polyacrylamide was added to the second feed resevoir of the homogenizer. The homogenizer was operated at a pressure of 43,000 PSI to produce a liquid microsuspension composition. The consistency of the polymer-oil solution is completely transparent and yellowish-brown color. The mircosuspension had a liquid consistency similar to water.

EXAMPLE 15

Method of Making a Liquid Microemulsion Composition with Calcium Nitrate 20 pounds of paraffinic oil and 1 pound of alkyl phenol exthoxylate are added into a first feed resevoir of a high pressure dual feed homogenizer 30 pounds of polyacrylamide, 50 pounds of water, 15 pounds of calcium nitrate and 0.17 pounds of ammonical nitrogen are added to the second feed resevoir of the homogenizer. The homogenizer is operated at a pressure of 43,000 PSI to produce a liquid microemulsion composition. The microemulsion has a liquid consistency similar to water.

EXAMPLE 16

Method of Making a Block Copolymer Composition

A liquid composition is made by combining water and surfactant. A suitable surfactant includes alkyl phenol exthoxylate and/or tall fatty acids. Inorganic salt(s) and any other optional agents are added to the water/surfactant mix. This mixture is mixed thoroughly until the salts dissolve. A soap base is then added to the mix. The soap base is suitably comprised of 75% tallow or fatty acids and 25% coconut oil, and is ground to a fine mesh, suitably 60 mesh. The mixture is then placed in a mechanical mixer and mixed. Citric acid and polyacrylamide are then slowly added to the mix, and the composition is mixed thoroughly. The final mix is poured into molds, compressed into blocks and is allowed to dry.

The polyacrylamide used is suitably of high to very high molecular weight (suitable ranges include 15-25 megagrams/mole and/or >500,000 acrylamide monomers, but can include other ranges as well). Suitably the polyacrylamide can be in the form of a dry bead having a diameter of 0.5-3 mm. The ratio of polyacrylamide to inorganic salt(s) can suitably be 3:1, 2:1, 1:1, 1:2 or 1:3. A suitable ratio also includes a ratio of 5:1 of polyacrylamide to inorganic salt(s).

Surfactant is provided in an amount which is suitably 1-7% by weight of the total composition. Water can also be provided, suitably in an amount which is 1-33% by weight of the total composition. Citric acid can be added in an amount which is suitably 1-10% by weight of the total composition. If the inorganic salt(s) used are calcium nitrate, calcium nitrate tetrahydrate, calcium nitrate trihydrate, calcium nitrite, potassium nitrate or potassium nitrite, ammoniacal nitrogen can also added. The inorganic salts aluminum chloral hydrate and calcium nitrate and/or potassium nitrate can also be combined with ammoniacal nitrogen. The ratio of ammoniacal nitrogen to inorganic salt(s) is suitably in a range of (0.05-3):1.

If the inorganic salt used is calcium sulfate, lignosulfonate can be added. The ratio of lignosulfonate to the inorganic salt(s) is suitably in a range of (0.05-3):1.

EXAMPLE 17

Block Copolymer Composition with Calcium Nitrate 200 grams of water is warmed between 50 to 60° C. 10 grams of alkyl phenol exthoxylate is added to the water. Next, 2 grams of ammoniacal nitrogen is added and the composition is mixed thoroughly. 200 grams of calcium nitrate is added to the water mixture and mixed thoroughly. 200 grams of soap base (75% of tallow and 25% of coconut oil) ground at mesh 60 is then added. 100 grams of citric acid are added to the mix of salts, surfactant, ammoniacal nitrogen, water and soap. Finally 300 grams of polyacrylamide are blended with the mix. The final mix is poured into molds and compressed at 400 PSI to form blocks of 250 grams approximately. The block is left 1 to 2 days at 30° C. and 35% relative humidity to dry.

EXAMPLE 18

Block Copolymer Composition with Calcium Nitrate 110 grams of very fine bagasse is added to 100 grams of cachaza, and 100 grams of calcium nitrate. This mixture is mixed for 5 minutes until the salts, bagasse, and cachaza are completely homogenized. 40 grams of polyacrylamide and 715 grams of molasses spilage are added to the mixture, and the mixture is again mixed. The final mix is poured into molds and compressed at 400 PSI to form blocks of 400 grams approximately. The final block is left 2 days at 30° C. and 35% relative humidity to dry.

EXAMPLE 19

Block Copolymer Composition with Sodium Silicate 200 grams of water is warmed to more than 95° C. 10 grams of surfactant (alkyl phenol exthoxylate) and 200 grams of sodium silicate is added to the heated water with the surfactant and the mixture is mixed thoroughly. 200 grams of a soap base (75% tallow and 25% of coconut oil) grinded very fine, at a mesh 60 is added. The mixture is again mixed. 100 grams of citric acid are added to the mix of sodium silicate, surfactant, water, and soap. After the water has cooled to below 40° C., 300 grams of polyacrylamide are blended with the mix. The final mix is poured into molds and compressed at 400 PSI to form blocks of 250 grams approximately. The block is left 1 to 2 days at 30° C. and 35% relative humidity to dry.

EXAMPLE 20

Block Copolymer Composition with Calcium Sulfate 200 grams of water is warmed between 50 to 60° C. 10 grams of surfactant (Alkyl phenol exthoxylate and tall fatty acids), 2 grams of lignosulfonate and 200 grams calcium sulfate are added to the warm water. 200 grams of soap base (75% tallow and 25% of coconut oil) grated very fine, at a mesh 60 is added. The soap is mixed with warm water, and calcium sulfate in an electrical mixer. 100 grams of citric acid are added to the mix of calcium sulfate, surfactant, lignosulfonate, water and soap. Finally 300 grams of polyacrylamide are blended with the mix. The final mix is poured into molds and compressed at 400 PSI to form blocks of 250 grams approximately. The block is left 2 days at 30° C. and 35% relative humidity to dry.

EXAMPLE 21

Erosion Control with Application of Dry Copolymer

The thickness of the mix of polyacrylamide and inorganic salts depends on the concentration of the polymer, and affects the overall effectiveness of the composition as an erosion preventative. The thicker the net of polymer, the more resistant the aggregate is to slacking or disintegration in discrete particles. For dry applications, the composition may be mixed with agricultural lime in granular form (not powdered lime), and applied with a fertilizer spreader to reduce sediment and sediment yield in runoff. The mixed application of polyacrylamide and inorganic salts are as follows:

| SLOPE % | Polymer application in lbs. |
| --- | --- |
| 0-5% | 30 lbs. per acre |
| 5-10% | 40 lbs. per acre |
| 10-15% | 50 lbs. per acre |
| 15-25% | 60 lbs. per acre |
| 25-35% | 70 lbs. per acre |
| >35% | 80-100 lbs. per acre |

When applied to grasses, the ratio of polyacrylamide to inorganic salt is suitably 1:1. For compost the ratio of polyacrylamide to inorganic salt is suitably 1:2. For prarie plants the ratio of polyacrylamide to inorganic salt is suitably 1:3.

EXAMPLE 22

Erosion Control with Application of Liquid Copolymer

The liquid application of polyacrylamide as an emulsion or small particle concentrate, is suitably done with droplets or particles smaller than 0.1 µm. These small particles are absorbed by the soil or dust particles. When the particles are added to plain water, they disperse instantly without agitation. The composition has flow characteristics similar to water, can be easily applied with a spay nozzle.

| SLOPE % | application |
| --- | --- |
| 0-5% | 20 gals. per acre |
| 5-10% | 30 gals. per acre |
| 10-15% | 40 gals. per acre |
| 15-25% | 50 gals. per acre |
| 25-35% | 60 gals. per acre |
| >35% | 80-100 gals. per acre |

When applied to grasses, the ratio of polyacrylamide to inorganic salt is suitably 1:1. For compost the ratio of polyacrylamide to inorganic salt is suitably 1:2. For prarie plants the ratio of polyacrylamide to inorganic salt is suitably 1:3.

EXAMPLE 23

Dust Control with Application of Dry Copolymer

The copolymers of the present invention can also be spread onto soil to temporarily glue together and bind colloidal particles or form a thin crust on soil, particularly in areas subject to continued use where dust clouds are problematic, such as construction sites, racetracks, and airfields. The greater the initial quantity of copolymer the more resistant is the aggregate and the soil surface to soil loss.

The dry application of the composition can be made with fertilizer spreader or spreader device mounted in a motorized vehicle. When using large amounts of the composition, a dry application with an agricultural spreader or seeder with a deflector is most efficient. The mix with application of polyacrylamide and inorganic salts are as follows:

| | |
|---|---|
| Sand with 50% fines | 200 lbs. per acre |
| Sand with 25% fines | 300 lbs. per acre |
| Sand with 10% fines | 400 lbs. per acre |

When used on sandy soils, the ratio of polyacrylamide to inorganic salt(s) is suitably 1:1. For soil with high silt content the ratio of polyacrylamide to inorganic salt(s) is suitably 1:2. For soils containing more clay the ratio of polyacrylamide to inorganic salt(s) is suitably 1:3.

EXAMPLE 24

Dust Control with Application of Liquid Copolymer

The liquid application of the copolymers of the present invention can be done as an emulsion or small particle concentrate, suitably with droplets or particles smaller than 0.1 µm. These small particles are absorbed by the soil or dust particles. When the particles are added to plain water, they disperse instantly without agitation. The composition has flow characteristics similar to water, can be easily applied with a spay nozzle. The application in gallons of polyacrylamide with inorganic salts for dust control in car race tracks, horse arenas, and mineral extraction:

| | |
|---|---|
| Sand with 50% fines | 200 gals. per acre |
| Sand with 25% fines | 300 gals. per acre |
| Sand with 10% fines | 400 gals. per acre |

The application in gallons of polyacrylamide with inorganic salts for dust control helicopter landings:

| | |
|---|---|
| Sand with 50% fines | 400 gals. per acre |
| Sand with 25% fines | 600 gals. per acre |
| Sand with 10% fines | 800 gals. per acre |

When used on sandy soils, the ratio of polyacrylamide to inorganic salt(s) is suitably 1:1. For soil with high silt content the ratio of polyacrylamide to inorganic salt(s) is suitably 1:2. For soils containing more clay the ratio of polyacrylamide to inorganic salt(s) is suitably 1:3.

EXAMPLE 25

Water Clarification with Application of Dry or Liquid Copolymer

The copolymers disclosed herein can be used to improve water clarity in detention basins and settling ponds, as well as to reduce sediment in receiving waters, particularly near large construction sites, to mitigate suspended sediment loads in the runoff. The copolymer is attracted to positively charged edges of the clay and silt in suspension, and bonds to particles based on positive-negative attraction, improving clarity of the water. Application of the copolymer of the present invention to settling ponds will allow particles less than 1 micron to settle in minutes. Additionally, the copolymer will prevent the bottom of the pond from clogging with fine particles, and therefore will allow continued infiltration of water into the ground, reducing maintenance needs of the pond.

The amount of the copolymer required depends on the concentration of sediment in the water; the use of 1 pound per acre-foot of water is recommended. Using additional amounts of the copolymer initially does not improve performance or water clarity. Dry compositions of the copolymer may also be provided to improve water clarity by passive delivery placing two pounds of the composition at the entrance of the runoff into the detention pond, at a rate of two pounds per acre-foot of water.

The use of the copolymer for water clarification can be made in liquid form, by depositing a water-soluble mix of polyacrylamide and inorganic salts at a rate of one gallon per acre-foot of water for run-off. The mix application in solid form of polyacrylamide and inorganic salts for water clarification as follows.

| Copolymer application in gallons. | |
|---|---|
| >1 to 1 acre-foot | 1 gals. |
| 1 acre-foot or more | 1 gals. per acre-foot of water |

The mix application in a block or bar of polyacrylamide and inorganic salts for water clarification as follows:

| Solid block or bar copolymer | |
|---|---|
| >1 to 1 acre-foot | 2 pound block |
| 1 acre-foot or more | 2 pound clock per acre-foot of waters |

EXAMPLE 26

Street Sweeping with Application of Liquid Copolymer

The copolymers disclosed herein may also be used in combination with street sweeping, in order to prevent street contaminants from washing into the storm sewers and ultimately into local watersheds. As disclosed, the polyacrylamide and inorganic salt composition attaches to positively charged edges of the dust contaminants on the streets. This attachment facilitates the collection by existing street sweeping equipment, increasing the cleaning efficiency up to 80%.

This method of application requires about 1 gallon of the copolymer per 500 gallons water tank in the street sweeper.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation lawfully accorded the appended claims.

All patents, publications and references cited herein are hereby fully incorporated by reference. In case of conflict between the present disclosure and incorporated patents, publications and references, the present disclosure should control.

The invention claimed is:

1. A composition comprising a copolymer comprising a non-toxic, anionic, water-soluble polyacrylamide and an inorganic salt selected from the group consisting of calcium nitrate, calcium nitrate tetrahydrate, calcium nitrate trihydrate, calcium nitrite, potassium nitrate and potassium nitrite, and wherein the copolymer has a chain longer than 500 angstroms, wherein said composition further comprises a surfactant and wherein said composition further comprises a soap base.

2. The composition of claim 1 wherein the inorganic salt is calcium nitrate.

3. The composition of claim 2 further comprising ammoniacal nitrogen.

4. The composition of claim 2 further comprising potassium nitrate.

5. The composition of claim 1 further comprising paraffinic oil, wherein the composition is a liquid.

6. The composition of claim 5 wherein the liquid is a microsuspension.

7. The composition of claim 1 wherein the inorganic salt is potassium nitrate.

8. The composition of claim 7 wherein the composition further comprises ammoniacal nitrogen.

9. The composition of claim 8 further comprising paraffinic oil, wherein the composition is a liquid.

10. The composition of claim 9 wherein the liquid is a microsuspension.

11. A composition comprising a copolymer comprising a non-toxic, anionic, water-soluble polyacrylamide and an inorganic salt selected from the group consisting of calcium nitrate, calcium nitrate tetrahydrate, calcium nitrate trihydrate, calcium nitrite, potassium nitrate and potassium nitrite, and wherein the copolymer has a chain longer than 500 angstroms, wherein said composition further comprises a surfactant and wherein said composition further comprises paraffinic oil, wherein the composition is a liquid.

12. The composition of claim 11 wherein the inorganic salt is calcium nitrate.

13. The composition of claim 12 further comprising ammoniacal nitrogen.

14. The composition of claim 12 further comprising potassium nitrate.

15. The composition of claim 11 wherein the inorganic salt is potassium nitrate.

16. The composition of claim 15 wherein the composition further comprises ammoniacal nitrogen.

17. A composition comprising polyacrylamide, bagasse, cachaza, and an inorganic salt selected form the group consisting of calcium nitrate, calcium nitrate tetrahydrate, calcium nitrate trihydrate, calcium nitrite, potassium nitrate and potassium nitrite.

18. A method of treating soil erosion of a sloped piece of land comprising: determining the degree of the slope of the piece of land; determining the acreage amount of the piece of land; applying an effective amount of the composition of claim 1.

19. A method of abating airborne dust from sandy piece of land comprising; determining the percent fine of the sand; determining the acreage amount of the piece of land; applying an effective amount of the composition of claim 1.

20. A method of improving water clarity in a section of water comprising: determining the acreage amount of the section of water; applying an effective amount of the composition of claim 1.

* * * * *